July 22, 1924.

L. A. HOERR 1,502,472

ANGLE COCK HOLDER

Filed Oct. 15, 1923

INVENTOR
L. A. HOERR
BY *E. E. Huffman*
ATTORNEY

Patented July 22, 1924.

1,502,472

UNITED STATES PATENT OFFICE.

LOUIS A. HOERR, OF ST. LOUIS, MISSOURI, ASSIGNOR TO RAILWAY DEVICES COMPANY, OF ST. LOUIS, MISSOURI, A CORPORATION OF MISSOURI.

ANGLE-COCK HOLDER.

Application filed October 15, 1923. Serial No. 668,472.

*To all whom it may concern:*

Be it known that I, LOUIS A. HOERR, a citizen of the United States of America, residing at the city of St. Louis, State of Missouri, United States of America, have invented a certain new and useful Angle-Cock Holder, of which the following is such a full, clear, and exact description as will enable anyone skilled in the art to which it appertains to make and use the same, reference being had to the accompanying drawings, forming part of this specification.

The object of my invention is to provide a simple and effective holder for angle cocks which will permit the adjustment of the position of the angle cock in the direction of the length of the train pipe. This I accomplish by forming on the angle cock at opposite sides, a pair of integral lugs carrying threaded bolts adjustably engaging with a supporting member.

Figure 1:
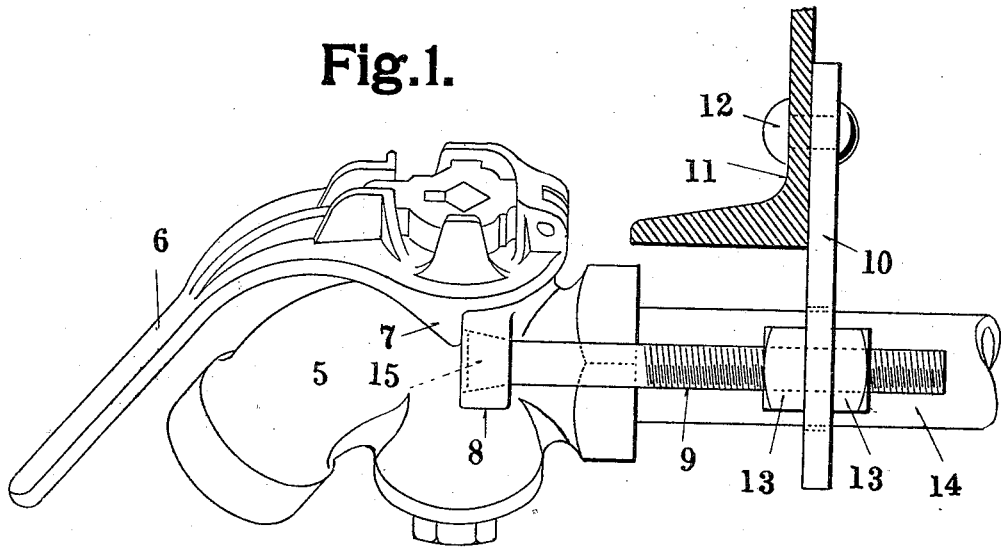
Figure 2:
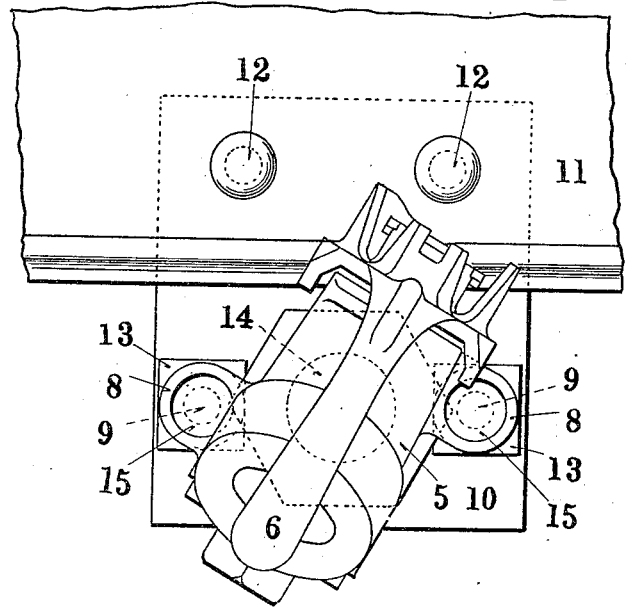

In the accompanying drawings which illustrate one form of holder made in accordance with my invention Figure 1 is a side view, and Figure 2 is a front elevation.

5 indicates an angle cock having a handle 6 of the self-locking type provided with the usual detent 7. Formed on opposite sides of the angle cock 5 are a pair of integral lugs 8, each provided with a tapering passage adapted to receive the tapered head 15 of a threaded bolt 9. The ends of the bolt 9 pass through openings in a plate 10 forming a supporting member and secured to the end sill 11 by bolts or rivets 12. The bolts 9 lie one at each side of and parallel to the train pipe 14, which is threaded into the angle cock 5 in the usual manner and passes through a suitable opening in the plate 10 between the bolt openings therein. Each of the bolts 9 is engaged by a pair of nuts 13, one arranged at each side of the plate as shown in Figure 1.

It will be evident that by varying the position of the nuts 13 on the bolts 9, the distance between the angle cock and the supporting plate 10 may be adjusted to accommodate different lengths of train pipe. The conical heads 15 of the bolts effectively prevent forward movement of the angle cock, the train pipe prevents rearward movement thereof, and the bolts being each firmly held by the double locking nuts, the proper angular position of the angle cock is maintained.

Having described my invention, what I claim as new and desire to secure by Letters Patent of the United States is:

1. In a device of the class described, the combination with an angle cock provided with a lug, of a bolt extending rearwardly from said lug, a supporting member through which said bolt passes and means for adjusting said bolt longitudinally whereby the distance between the support and angle cock may be varied.

2. In a device of the class described, the combination with an angle cock provided with a pair of lugs arranged at opposite sides thereof, of bolts extending rearwardly from said lugs, a supporting member through which said bolts pass and means for adjusting said bolts longitudinally whereby the distance between the support and angle cock may be varied.

3. In a device of the class described, the combination with an angle cock having a lug, of a threaded bolt extending rearwardly from said lug, a supporting member having an opening for the passage of said bolt, and a pair of nuts on said bolt, one on each side of said member whereby the distance between the support and angle cock may be varied.

4. In a device of the class described, the combination with an angle cock having a pair of lugs arranged on opposite sides thereof, a pair of threaded bolts extending rearwardly from said lugs, a supporting member having openings for the passage of said bolts, and a pair of nuts on each of said bolts, one on each side of said member whereby the distance between the support and angle cock may be varied.

5. In a device of the class described, the combination with an angle cock provided with an actuating handle, of a lug carried by said cock and forming a stop for said handle, a bolt extending rearwardly from said lug, a supporting member through which said bolt passes and means for adjusting said bolt longitudinally whereby the distance between the support and angle cock may be varied.

In testimony whereof, I have hereunto set my hand and affixed my seal.

LOUIS A. HOERR.